(12) United States Patent
Chen et al.

(10) Patent No.: US 11,875,481 B2
(45) Date of Patent: Jan. 16, 2024

(54) METHOD AND SYSTEM FOR COMPENSATING IMAGE HAVING FIXED PATTERN NOISE

(71) Applicant: REALTEK SEMICONDUCTOR CORP., Hsinchu (TW)

(72) Inventors: Yan-Fong Chen, Hsinchu (TW); Wen-Tsung Huang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 206 days.

(21) Appl. No.: 17/399,361

(22) Filed: Aug. 11, 2021

(65) Prior Publication Data

US 2022/0051369 A1 Feb. 17, 2022

(30) Foreign Application Priority Data

Aug. 12, 2020 (TW) ................. 109127426

(51) Int. Cl.
*G06T 5/00* (2006.01)
*G06T 5/50* (2006.01)
*G06T 3/40* (2006.01)

(52) U.S. Cl.
CPC ............ *G06T 5/002* (2013.01); *G06T 3/4007* (2013.01); *G06T 3/4015* (2013.01); *G06T 5/50* (2013.01); *G06T 2207/20021* (2013.01); *G06T 2207/20024* (2013.01); *G06T 2207/20216* (2013.01)

(58) Field of Classification Search
CPC .. G06T 5/00; G06T 5/002; G06T 3/40; G06T 3/4007; G06T 3/4015; G06T 3/403; G06T 5/50; G06T 2207/20021; G06T 2207/20024; G06T 2207/20216
See application file for complete search history.

(56) References Cited

U.S. PATENT DOCUMENTS

| 7,769,230 B2 | 8/2010 | Pillman et al. | |
| 8,310,577 B1 * | 11/2012 | Neter | H04N 23/843 |
| | | | 348/308 |
| 8,817,120 B2 * | 8/2014 | Silverstein | H04N 25/67 |
| | | | 348/222.1 |
| 9,148,551 B2 * | 9/2015 | Hussey | H04N 25/671 |

(Continued)

FOREIGN PATENT DOCUMENTS

| TW | 200835302 A | 8/2008 |
| TW | I528816 B | 4/2016 |

*Primary Examiner* — Bobbak Safaipour
*Assistant Examiner* — Benedict E Lee
(74) *Attorney, Agent, or Firm* — Li & Cai Intellectual Property (USA) Office

(57) ABSTRACT

A method and a system for compensating an image having fixed pattern noise are provided. The method is adapted to a 4-cell sensor and can automatically calculate appropriate compensation parameters for fixed pattern noise according to non-uniformity of the sensor and lens. Since the defects in the sensor or the lens may cause non-uniform fixed pattern noise, an image is firstly divided into multiple grids and a pixel average of every channel in the grids is calculated. Afterwards, a fixed pattern noise compensation coefficient of every pixel can be calculated according to characteristics of the image formed by the 4-cell sensor. In one aspect, the compensation coefficient of the current pixel can be calculated by extrapolation or interpolation. The fixed pattern noise in the image can be corrected.

18 Claims, 10 Drawing Sheets

(56) References Cited

U.S. PATENT DOCUMENTS

| | | |
|---|---|---|
| 9,148,594 B2 | 9/2015 | Yuen et al. |
| 2013/0021484 A1* | 1/2013 | Sorek ............... G06T 5/003 |
| | | 348/208.4 |
| 2017/0206689 A1* | 7/2017 | Eo ................... G06T 3/4007 |

* cited by examiner

METHOD AND SYSTEM FOR COMPENSATING IMAGE HAVING FIXED PATTERN NOISE

CROSS-REFERENCE TO RELATED PATENT APPLICATION

This application claims the benefit of priority to Taiwan Patent Application No. 109127426, filed on Aug. 12, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The disclosure is generally related to an image compensation technology, and more particularly to a method for compensating an image formed by an image sensor that produces fixed pattern noise and a system thereof.

BACKGROUND OF THE DISCLOSURE

One of the reasons that a fixed pattern noise (FPN) occurs in an image is that a noise with higher brightness than a background may easily occur to a specific position of pixels under long exposure. With photography as an example, various noises with different brightness than the background may occur at a fixed position in a photo, even if the photo is taken at different scenes. The noises may be classified into two types: dark signal non-uniformity (DSNU) and photo response non-uniformity (PRNU). The DSNU indicates a fixed pattern noise that is detected when the lens is covered. The PRNU indicates a fixed pattern noise that is produced due to a pixel having inconsistent responses to the lights.

The noise can be expressed by a formula of: $P_{read}=gain \times P_{real}+offset$. "$P_{read}$" represents a pixel value sensed by an image sensor, "gain" represents the noise caused by photo response non-uniformity, and "offset" represents the noise caused by dark signal non-uniformity. The formula indicates that the fixed pattern noise appearing in a dark environment can be compensated by calculating an offset, and the fixed pattern noise appearing under a normal light can be corrected by calculating a gain.

However, the fixed pattern noise may have problems of non-uniformity. For example, when a lens and an image sensor of an image retrieving device has poor quality, the fixed pattern noise may be non-uniform, such as left-right non-uniformity or up-down non-uniformity. Further, both left-right non-uniformity and up-down non-uniformity may occur at the same time when the lens and the image sensor of the image retrieving device are of poor quality.

A conventional fixed pattern noise correction (FPNC) is provided. FPNC is a grid-based image compensation technology that is used to correct the fixed pattern noise by regions of the image. Nevertheless, when the image meets up-to-down non-uniformity, some of the fixed pattern noise may still remain on the image.

SUMMARY OF THE DISCLOSURE

The present disclosure is related to a method for compensating an image having fixed pattern noise and a system implementing the method. The method can be performed by a software program or hardware in a specific system. With an image sensor as an example, an image is formed when a light is received via a lens and processed by the image sensor. A processing circuit in the system performs the method for compensating the image having fixed pattern noise.

The method for compensating an image having fixed pattern noise is adapted to a 4-cell sensor that implements an image sensor for every pixel channel by using a 4-cell group. In the method, the appropriate compensation parameters for fixed pattern noise can be calculated automatically based on the non-uniformity of the image sensor and lens.

In one embodiment of the disclosure, in the main process of the method for compensating image having fixed pattern noise, an image is divided into multiple grids in an array, in which each of the grids includes multiple 4-cell groups, each of the 4-cell groups includes 4 cells, and each cell includes 4 pixels. Afterwards, a pixel average for every channel of each of the grids is calculated, and a pixel average for every pixel in each of the 4-cell groups is also calculated. Further, a fixed pattern noise compensation coefficient for every pixel of the image can be calculated according to a ratio of the pixel average of every channel in each grid and the pixel average of the pixels in each grid. The fixed pattern noise compensation coefficient for every pixel is multiplied by a pixel value of every pixel so as to complete the fixed pattern noise compensation.

Preferably, the 4 cells of every 4-cell group records the values of a green channel (Gr), a red channel (R) and a green channel (Gb) that are generated by a 4-cell sensor through a quad Bayer array filter.

Further, in an exemplary example of the disclosure, the 4-cell of every 4-cell group include 16 pixels. The positions of the pixels can be represented by position indexes. The above-mentioned pixel average of every channel in each of the grids is an average that is calculated based on a summation of the pixel values of the pixels with the same position indexes. The pixel average of every channel is a channel average.

In an aspect of the disclosure, the pixel value of a current pixel is multiplied by the fixed pattern noise compensation coefficient of the current pixel so as to compensate a fixed pattern noise of the image. Further, when facing various intensities of different light sources, an adjustment parameter is introduced to adjust strength of the fixed pattern noise compensation coefficient. The pixel value that is adjusted and that has undergone fixed pattern noise compensation is then obtained.

Further, when the fixed pattern noise compensation is completed, a further step is performed to detect a stripe pattern caused by differences between the pixel values of a green pixel and other green pixels in the up and down directions or left and right directions of the green pixel. A process of self-adaptive compensation is then performed.

Still further, extrapolation can be used to optimize the fixed pattern noise compensation coefficient for edge pixels in the image. For extrapolation, one row and one column can be added outside an edge of the image with multiple grids in an array form, and the fixed pattern noise compensation coefficient for the edge pixels can be obtained by an extrapolation operation.

Further, in one embodiment of the disclosure, interpolation is then used to calculate the fixed pattern noise compensation coefficient for the current pixel. In the interpolation, a plurality of grids adjacent to the current pixel are firstly determined, and then distances between the centers of the plurality of grids and the current pixel are calculated. The fixed pattern noise compensation coefficient for the current pixel can be obtained by an interpolation operation according to the distances.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

FIG. 2 is a schematic diagram depicting red, green and blue pixels shown by multiple 4-cells in one embodiment of the disclosure;

FIG. 3 is a schematic diagram depicting multiple 4-cell groups in a grid in one embodiment of the disclosure;

FIG. 5 is a schematic diagram depicting calculation of compensation coefficient for edge pixels in the method for compensating the image having fixed pattern noise according to one embodiment of the disclosure;

FIG. 7A and FIG. 7B show schematic diagrams depicting pixels in vertical and horizontal directions of the current pixel in one embodiment of the disclosure;

FIG. 8A and FIG. 8B are schematic diagrams depicting pixels that are used to correct stripe patterns in the image in one embodiment of the disclosure;

DETAILED DESCRIPTION OF THE EXEMPLARY EMBODIMENTS

Figure 1:
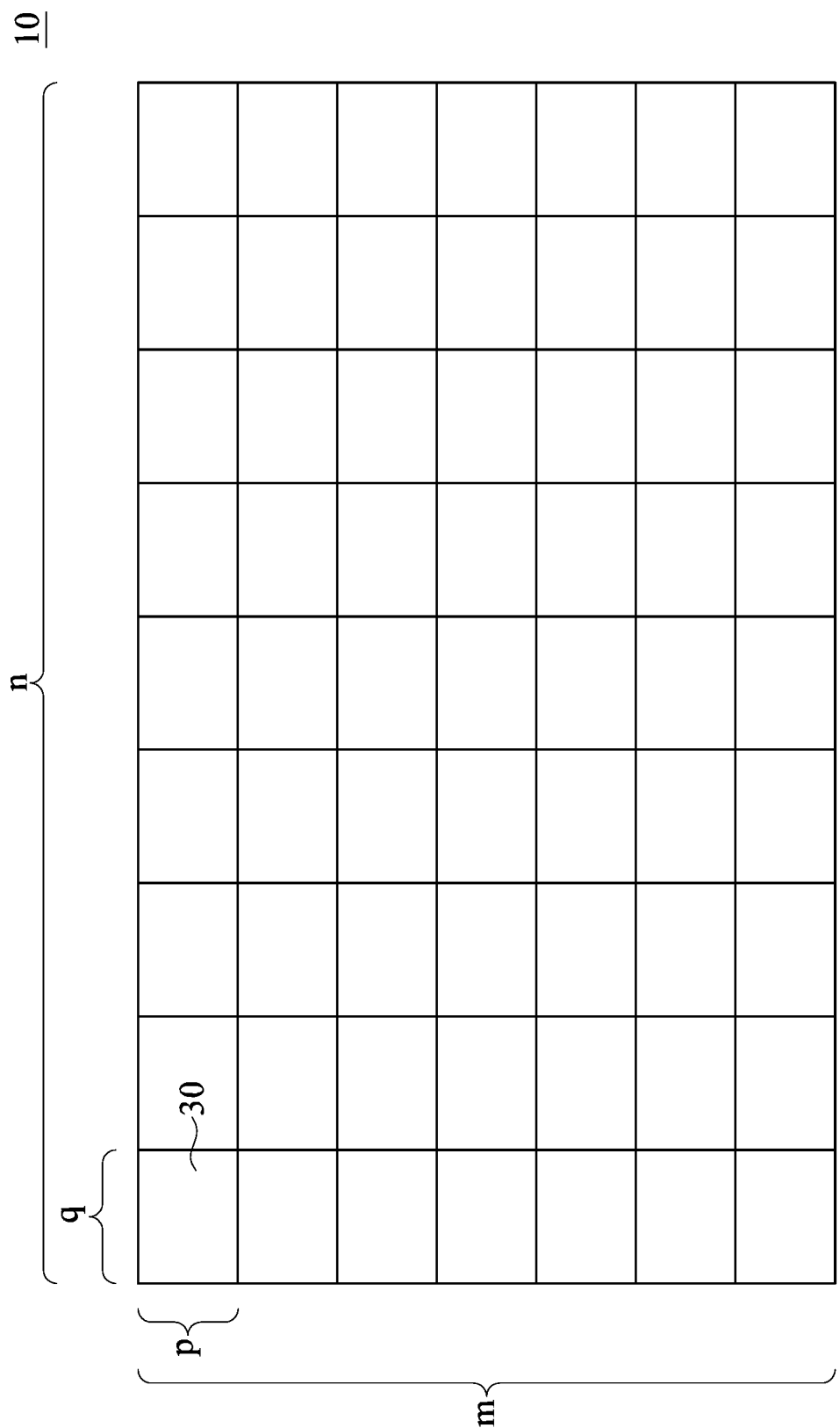
FIG. 1 is a schematic diagram depicting image grids obtained by dividing an image.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Fixed pattern noise (FPN) often occurs to an image that is formed by an image sensor. One of the reasons that the noise occurs is that some positions of pixels of the image being generated by a digital imaging sensor have higher brightness noises relative to the background. In general, the noises form the fixed pattern noise due to the lens or the image sensor being defective.

The disclosure is related to a method for compensating an image having fixed pattern noise and a system thereof. The method is adapted to an image sensor that forms the fixed pattern noise so as to achieve fixed pattern noise correction (FPNC). The process in the method is mainly to obtain a set of appropriate fixed pattern noise compensation coefficients that are used to perform fixed pattern noise compensation.

The method for compensating an image having fixed pattern noise is adapted to compensating an image generated by an image sensor. The method can be a grid-based fixed pattern noise compensation method that can compensate the image regionally. The method is generally used to solve the non-uniform fixed pattern noise issue in the image.

In the method for compensating an image having fixed pattern noise, a uniform image is provided, and the image is divided into "m×n" grids. Reference is made to FIG. 1, which is a schematic diagram depicting an image 10 being divided into multiple grids. In the present example, the height of the image 10 is divided into "m" segments and the width of the image 10 is divided into "n" segments, so as to form the image 10 with "m×n" grids 30. The size of each of the grids 30 is "p×q."

Figure 2:
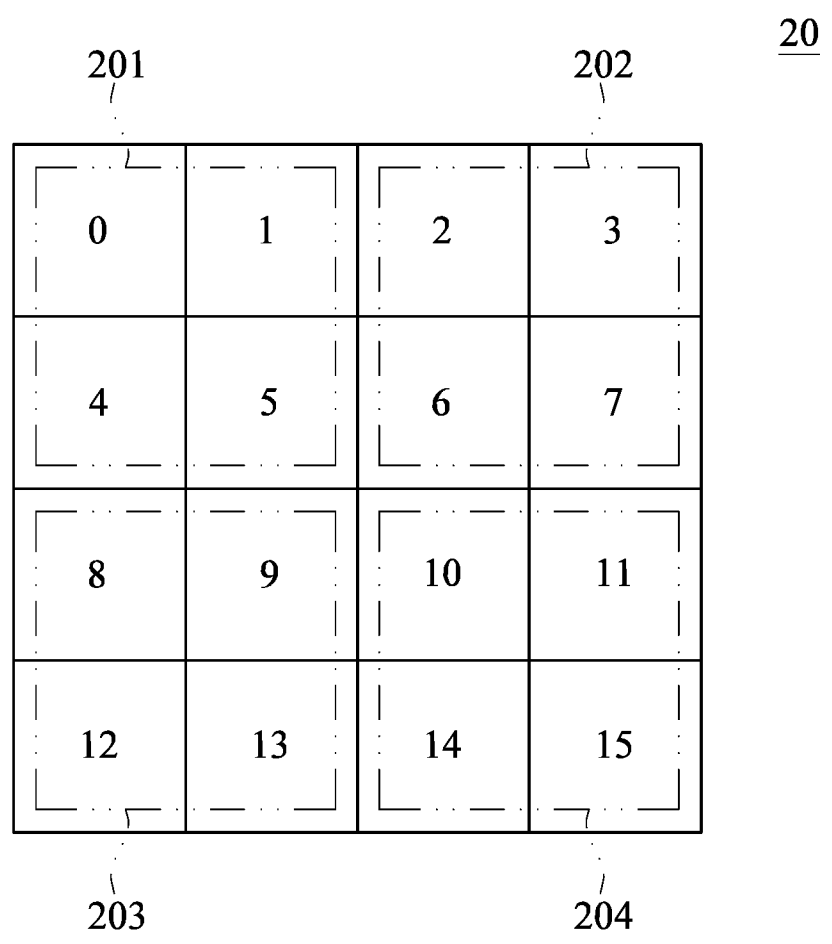

Every grid 30 is consisted of multiple 4-cell groups. 4-cell group complies with a format specified to a 4-cell sensor that is adapted to the method for compensating an image having fixed pattern noise. In one of the embodiments, the 4-cell sensor forms an image that is depicted by red, green and blue pixels, i.e., 4 cells, as shown in FIG. 2, via a quad Bayer array. In the present example, a 4-cell group 20 includes a first 4-cell 201, a second 4-cell 202, a third 4-cell 203 and a fourth 4-cell 204. The pixel is the smallest unit to describe an entire image. In FIG. 2, the numbers 0 to 15 represent position indexes representing positions of the pixels.

In the present example, every 4-cell group 20 is consisted of 4 pixels that can be composed of red, green and blue pixels. A first 4-cell 201 is a green pixel (Gr), a second 4-cell 202 is a red pixel (R), a third 4-cell 203 is a blue pixel (B), and a fourth 4-cell 204 is a green pixel (Gb). The first 4-cell 201 (Gr) is the green pixel adjacent to the second 4-cell 202 (R). The fourth 4-cell 204 (Gb) is the other green pixel adjacent to the third 4-cell 203 (B).

Figure 3:
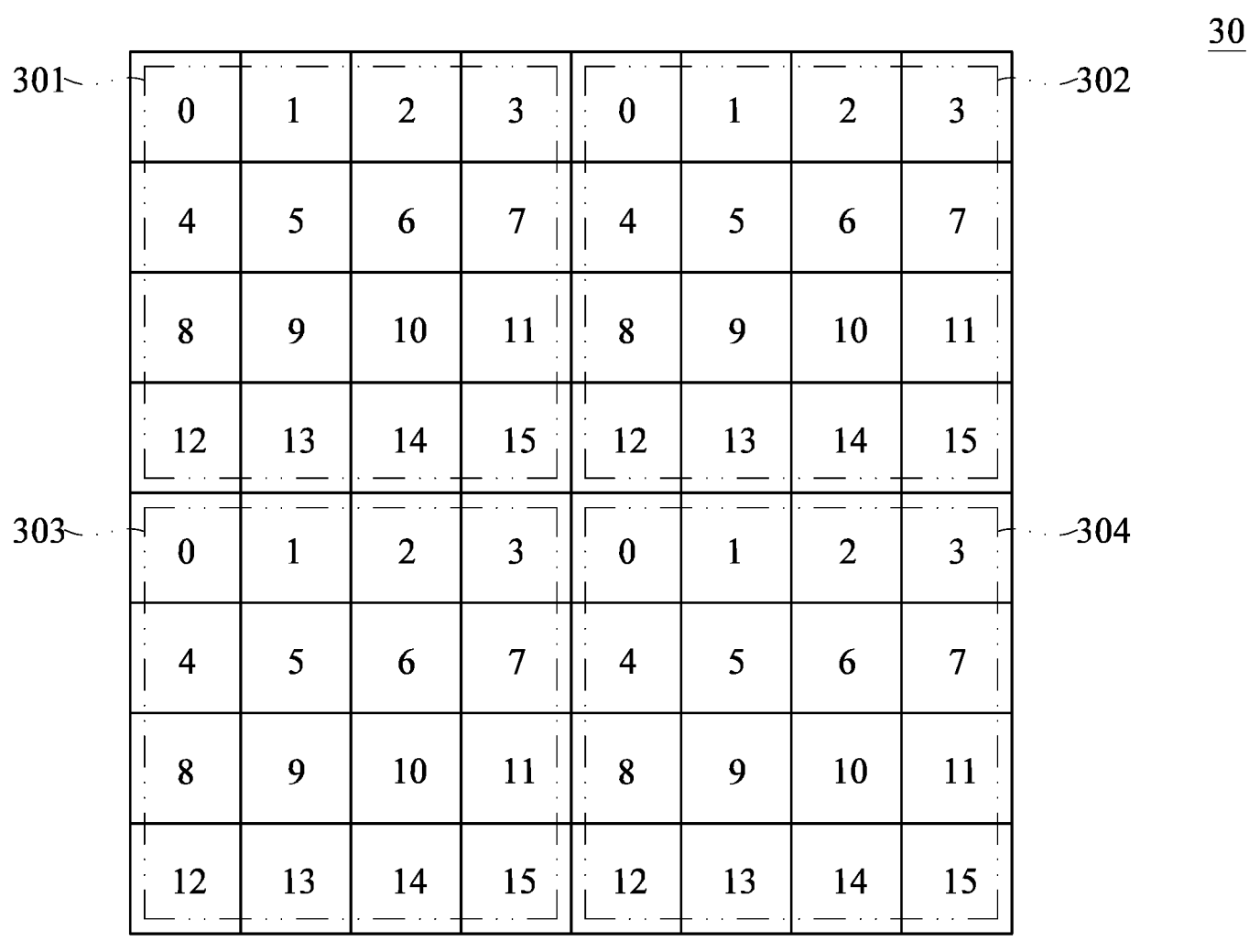

FIG. 3 is a schematic diagram depicting that the image 10 is divided into multiple grids 30, and every grid 30 is consisted of multiple 4-cell groups, such as the 4-cell group 20 schematically shown in FIG. 2. The present example shows that the grid 30 is consisted of four 4-cell groups, i.e., a first 4-cell group 301, a second 4-cell group 302, a third 4-cell group 303 and a fourth 4-cell group 304.

The 4-cell groups 301, 302, 303 or 304 can be indicated by the pixels with the position indexes 0 to 15. According to one embodiment of the method for compensating an image having fixed pattern noise, the image 10 is divided into multiple grids, and each of the grids can be described by an average (localAvg) of a summation of the pixel values of the pixels with the same position indexes in the grid. Therefore, a compensation coefficient for each of the grids can be obtained.

Figure 10:
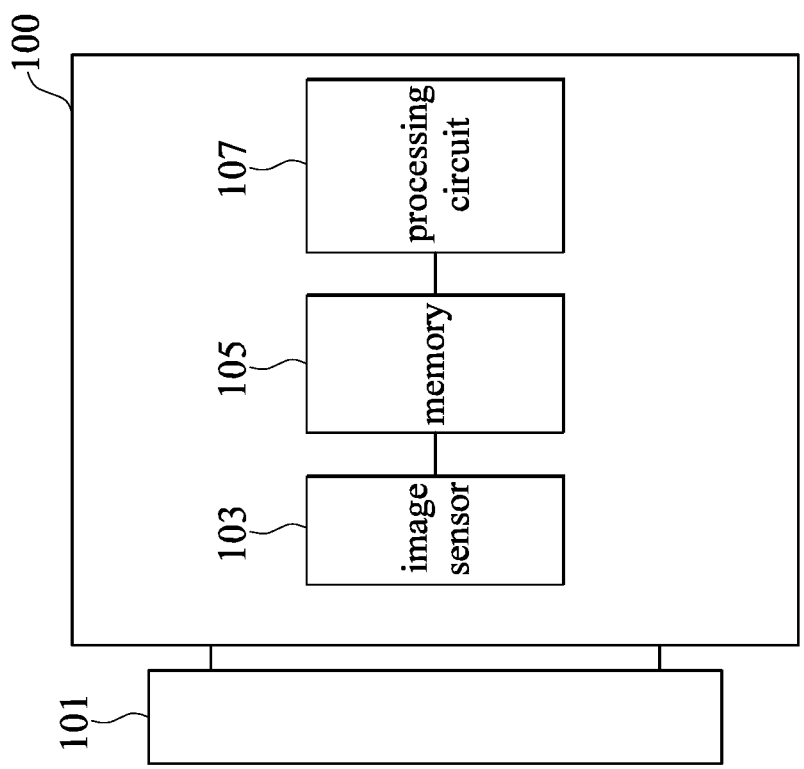
FIG. 10 shows a framework of a system for performing the method for compensating an image having fixed pattern noise according to one embodiment of the disclosure.

The method can be implemented in a system via a software program, a firmware or a circuit. Reference is made to FIG. 10, in which a system 100 particularly includes an image sensor 103 and other components. The system 100 is such as a camera including a lens 101, the image sensor 103, a memory 105 and a processing circuit 107. The system 100 processes the image data generated by the image sensor 103 via software or firmware. For example, a software program can be used to operate the method for compensating an image having fixed pattern noise, or alternatively, the firmware operated in the processing circuit 107 can also be used to perform the method.

Figure 4:
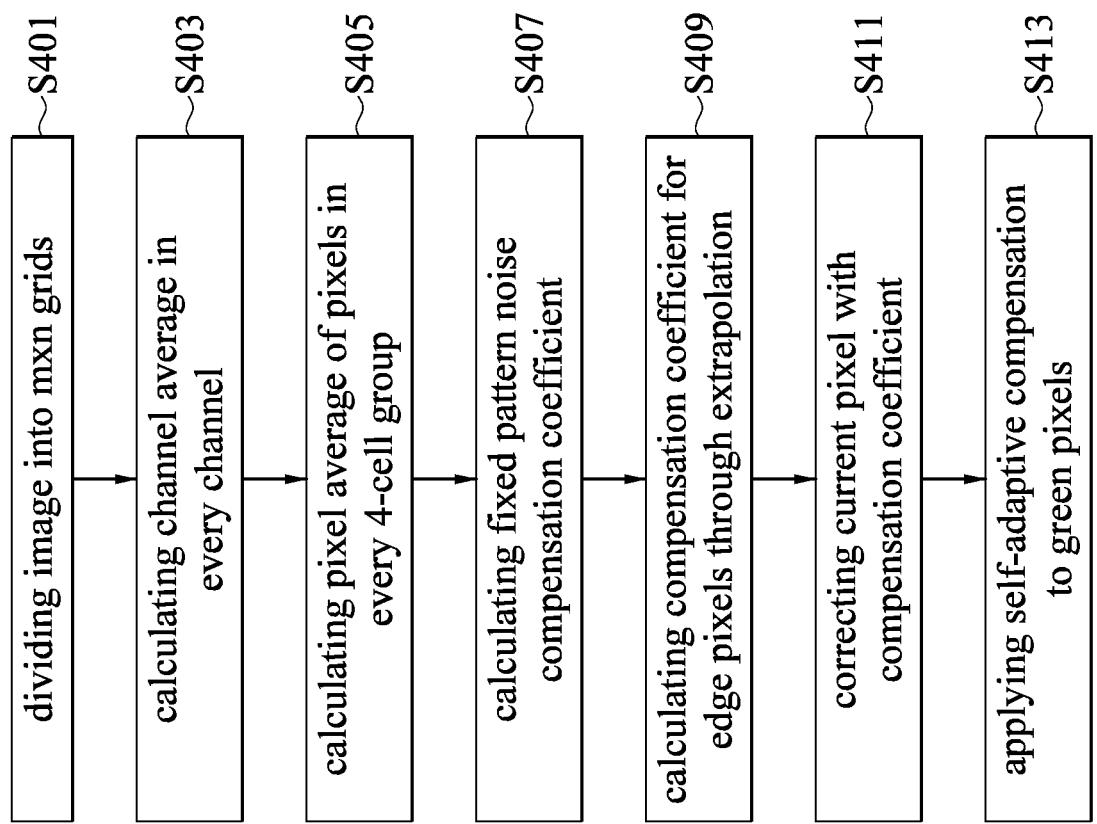
FIG. 4 shows a flow chart describing a method for compensating an image having fixed pattern noise according to one embodiment of the disclosure.

In the method for image compensation, a compensation coefficient can be corrected to an appropriate value firstly. The corrected compensation coefficient is used to compensate the fixed pattern noise (FPN) occurs when the image sensor generates the image. In particular, the method is a grid-based compensation method that can regionally compensate the fixed pattern noise. FIGS. 1, 2 and 3 show the preliminary gridding operations for the image, and the method thereof can be referred to as in FIG. 4.

When an image such as a uniform image under a normal light source is received, the image can be divided into rectangular grids in an array, e.g., "m×n" grids. Referring to grid 30 shown in FIG. 1, the grid 30 includes multiple 4-cell groups, as shown in FIG. 3. Every cell includes four pixels, Gr, Gb, R and B, so that a 4-cell includes 16 pixels. As shown in FIG. 2, the position of the pixel can be represented by the position index (0-15) (step S401). With a 4-cell sensor adopted in the method as an example, the 4 cells of the 4-cell group respectively record red (R), blue (B) and green channel (Gr, Gb) values generated by a 4-cell sensor through a quad Bayer array filter. When receiving the pixel values of the red, green and blue channels of the image, a pixel average of pixels in each of the channels (i.e., channel average) in every grid can be calculated. According to one of the embodiments, an average (localAvg) is calculated from a summation of the pixel values at the same position index in the grid. The channel averages for the channels in the grid can be represented by BGridAvg(i,j), RGridAvg(i,j), GbGridAvg(i,j) and GrGridAvg(i,j) that are the averages of blue channel, red channel, Gb channel and Gr channel respectively (step S403). Further, a pixel average (localAvg (i,j,k)) of pixels in every 4-cell group can also calculated, and in one embodiment the pixel average can represent the pixel value respective to the channel (step S405). In the above functions, "(i, j)" represents the position of each of the grids in the "m×n" array, and relationships of the variables thereof are "1<=i<=m" and "1<=j<=n." For example, "BGridAvg(i,j)" represents the blue channel value of the grid in row i and column j, "RGridAvg(i,j)" represents the red channel value of the grid in row i and column j, "GbGridAvg(i,j)" represents the green channel value (Gb) of the grid in row i and column j, and "GrGridAvg(i,j)" represents the other green channel value (Gr) of the grid in row i and column j. Furthermore, "k" represents the position of every pixel in the 4-cell group and "k" is such as the 0 to 15 position indexes mentioned above.

The fixed pattern noise can be depicted by the equation: "$P_{read}$=gain×$P_{real}$+offset", in which "$P_{read}$" represents a pixel value sensed by the image sensor, "offset" represents the dark signal non-uniformity (DSNU) or photo response non-uniformity (PRNU). The fixed pattern noise appeared under a normal light source is obtained by calculating a gain, i.e., the fixed pattern noise compensation coefficient of the method, for the purpose of correction.

According to the image information such as "BGridAvg (i,j), RGridAvg(i,j), GbGridAvg(i,j), GrGridAvg(i,j) and localAvg(i,j,k)" obtained from the grids, the fixed pattern noise compensation coefficients (COEF) for the pixels in the red, green and blue channels are calculated (step S407). The fixed pattern noise compensation coefficient (gain(i,j,k)) can be calculated by the equations as follows.

It should be noted that, as the embodiment shown in FIG. 2, the first 4-cell 201 is the green pixel (Gr) and the position indexes (i.e., "k") thereof are 0, 1, 4 and 5, the second 4-cell 202 is the red pixel (R) and the position indexes thereof are 2, 3, 6 and 7, the third 4-cell 203 is the blue pixel (B) and the position indexes thereof are 8, 9, 12 and 13, and the fourth 4-cell 204 is the green pixel (Gb) and the position indexes thereof are 10, 11, 14 and 15.

The fixed pattern noise compensation coefficient (gain(i, j,k)) can be calculated by using equation 1. Equation 1 shows that the compensation coefficient for every pixel in the grid is based on a ratio of the channel average of each of the grids and the pixel average (localAvg(i,j,k)) of the pixels in every channel.

gain $(i,j,0)$=GrGridAvg $(i,j)$÷localAvg $(i,j,0)$;

gain $(i,j,1)$=GrGridAvg $(i,j)$÷localAvg $(i,j,1)$;

gain $(i,j,2)$=RGridAvg $(i,j)$÷localAvg $(i,j,2)$;

gain $(i,j,3)$=RGridAvg $(i,j)$÷localAvg $(i,j,3)$;

gain $(i,j,4)$=GrGridAvg $(i,j)$÷localAvg $(i,j,4)$;

gain $(i,j,5)$=GrGridAvg $(i,j)$÷localAvg $(i,j,5)$;

gain $(i,j,6)$=RGridAvg $(i,j)$÷localAvg $(i,j,6)$;

gain$(i,j,7)$=RGridAvg$(i,j)$÷localAvg$(i,j,7)$;

gain $(i,j,8)$=BGridAvg $(i,j)$÷localAvg $(i,j,8)$;

gain $(i,j,9)$=BGridAvg $(i,j)$÷localAvg $(i,j,9)$;

gain $(i,j,10)$=GbGridAvg $(i,j)$÷localAvg $(i,j,10)$;

gain $(i,j,11)$=GbGridAvg $(i,j)$÷localAvg $(i,j,11)$;

gain $(i,j,12)$=BGridAvg $(i,j)$÷localAvg $(i,j,12)$;

gain $(i,j,13)$=BGridAvg $(i,j)$÷localAvg $(i,j,13)$;

gain $(i,j,14)$=GbGridAvg $(i,j)$÷localAvg $(i,j,14)$; and gain $(i,j,15)$=GbGridAvg $(i,j)$÷localAvg $(i,j,15)$   Equation 1.

According to above equations, "gain(i,j,k)" indicates a fixed pattern noise compensation coefficient for each of pixels (positions "k"=0 to 15) in a 4-cell group in every grid (i, j). An adjustment coefficient may be added to the image that is to be compensated if necessary. In the current step, the fixed pattern noise compensation coefficient for every corrected pixel is multiplied by the pixel value of the pixel. The fixed pattern noise compensation coefficient for every pixel is used to compensate an input image having fixed pattern noise.

Figure 5:
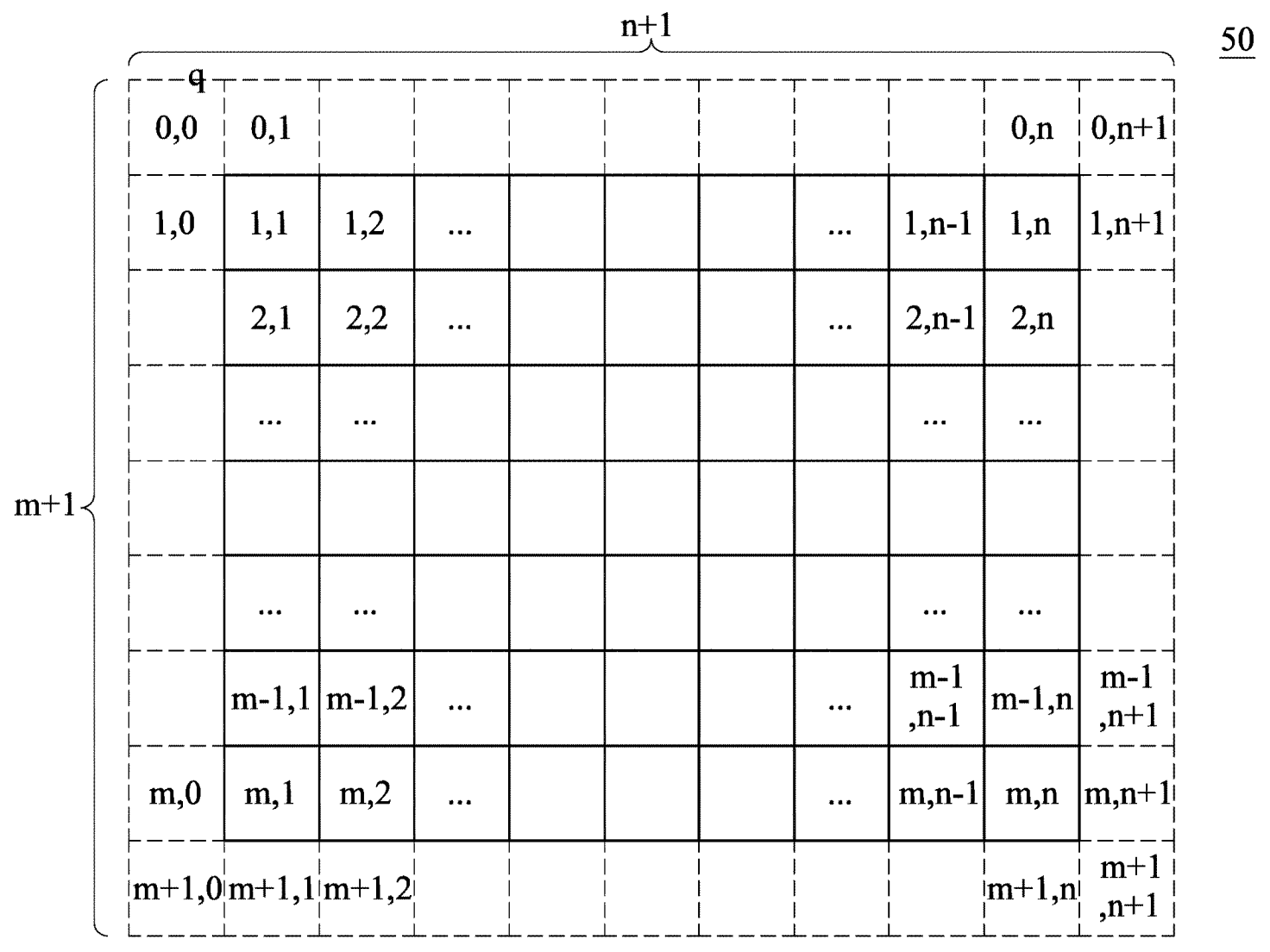

Furthermore, for compensating the edge pixels in every grid that has a size of "p×q", the corrected fixed pattern noise compensation coefficient can be obtained in equation 1, and the fixed pattern noise compensation coefficients (gain) for the edge pixels can be calculated by extrapolation so as to optimize the compensation coefficients for the edge pixels (step S409). Reference is made to FIG. 5, and the above-mentioned edge pixels in every grid can be specified to the pixels which are distanced from the upper and lower edges within p/2 and from the left and right edges within q/2.

For optimizing the compensation coefficients for the edge pixels, two rows and two columns are added outside the edges of each of the grids which are exemplarily "m×n" grids divided in an array form from an original image. As the grids shown in FIG. 5, the grids of an image 50 become "(m+2)×(n+2)" grids when the two rows and two columns are added to the edges. The fixed pattern noise compensation coefficients for the edge pixels can be obtained by extrapolation, and the compensation can be optimized accordingly. The fixed pattern noises for the edges and corner pixels of the image can be obtained by calculating the gain(i,j,k), in which "k" represents position indexes of the pixels in the 4-cell group. The fixed pattern noise compensation coefficient can be calculated from equation 2.

Upper edge: gain(0,j,k)=2×gain(1,j,k)−gain(2,j,k), in which 1≤j≤n;

Lower edge: gain(m+1,j,k)=2×gain(m,j,k)−gain(m−1,j,k), wherein 1≤j≤n;

Left edge: gain(i,0,k)=2×gain(i,1,k)−gain(i,2,k), wherein 1≤i≤m;

Right edge: gain(i,n+1,k)=2×gain(i,n,k)−gain(i,n−1,k), wherein 1≤i≤m;

Upper-left: gain(0,0,k)=2×gain(1,1,k)−gain(2,2,k);

Upper-right: gain(0,n+1,k)=2×gain(1,n,k)−gain(2,n−1,k);

Lower-left: gain(m+1,k)=2×gain(m,1,k)−gain(m−1,2,k); and

Lower-right: gain(m+1,n+1,k)=2×gain(m,n,k)−gain(m−1,n−1,k);  Equation 2 where "m" is a height of an original grid of the image; "n" is a width of the original grid of the image; "gain(i,j,k)" is the fixed pattern noise compensation coefficient of every pixel of the image; "(i,j)" indicates position of the grid when the rows and columns are newly added; and "k" indicates the position index of the cell.

The above steps describe that the fixed pattern noise compensation coefficient for every pixel of the image is obtained and the corrected fixed pattern noise compensation coefficient is used to optimize the fixed pattern noise compensation coefficient for the edge pixels. Next, the corrected fixed pattern noise compensation coefficient is used to enhance the compensation for the pixel (step S411).

Figure 6:
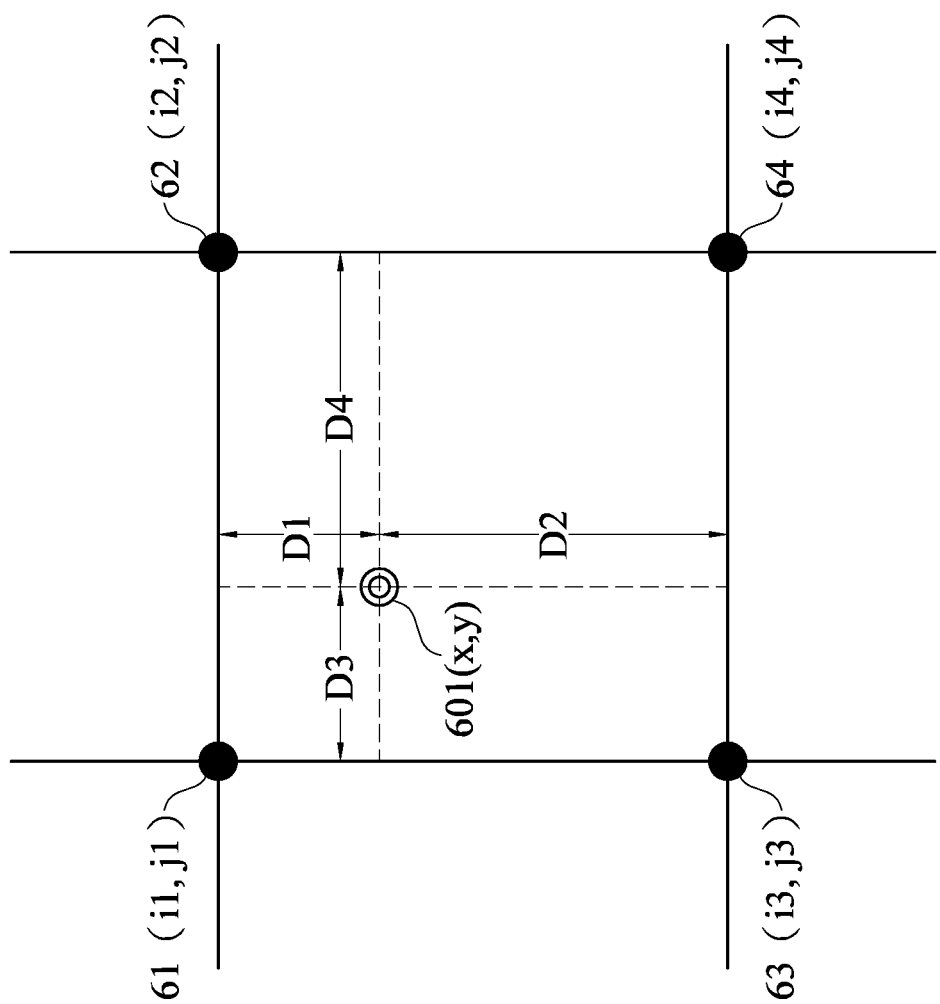
FIG. 6 is a schematic diagram depicting determination of the adjacent grids of a current pixel in the method for compensating an image having fixed pattern noise according to one embodiment of the disclosure.

In the present step, when correcting the fixed pattern noise pixel by pixel, interpolation is incorporated to obtain the fixed pattern noise compensation coefficient for the current pixel. In the interpolation, the grids adjacent to the current pixel are determined, generally, there are plural adjacent grids. Reference is made to FIG. 6, which shows coordinates (x, y) of a current pixel 601. The current pixel 601 is in a grid and the adjacent grids thereof are represented by their center points or central pixels. For example, the center points are such as a center point 61(i1, j1) of the upper-left grid, a center point 62(i2, j2) of the upper-right grid, a center point 63(i3, j3) of the bottom-left grid, and a center point 64(i4, j4) of the bottom-right grid that respectively represent the upper-left grid (i1=2, j1=3), the upper-right grid (i2=2, j2=4), the bottom-left grid (i3=3, j3=3) and the bottom-right grid (i4=3,j4=4).

The compensation coefficient for the current pixel 601 is also obtained by interpolation. In the interpolation, distances between the current pixel 601 and the center points 61, 62, 63 and 64 of the adjacent grids of the current pixel 601 are calculated. The distances are such as a distance D1 between the current pixel 601 and the upper-right grid (i.e., the center point or a central pixel), a distance D2 between the current pixel 601 and the bottom-right grid, a distance D3 between the current pixel 601 and bottom-left grid, and a distance D4 between the current pixel 601 and the bottom-right grid.

Thus, the interpolation is performed based on the distances D1, D2, D3 and D4 and can be referred to as in equation 3 as follows. In equation 3, the compensation coefficient for the current pixel can be obtained through a bilinear interpolation.

gain_intp(k)=(D2/(D1+D2))×(D4/(D3+D4))×gain(i1,j1,k)+(D2/(D1+D2))×(D3/(D3+D4))×gain(i2,j2,k)+(D1/(D1+D2))×(D4/(D3+D4))×gain(i3,j3,k)+(D1/(D1+D2))×(D3/(D3+D4))×gain(i4,j4,k);  Equation 3 where "gain_intp(k)" is the fixed pattern noise compensation coefficient for the current pixel being obtained by interpolation, and "gain(i1,j1,k), gain(i2,j2,k), gain(i3,j3,k)" and "gain(i4,j4,k)" are the fixed pattern noise compensation coefficients for central pixels of the grids adjacent to the current pixel.

When the interpolation is used to obtain the fixed pattern noise compensation coefficient (gain_intp(k)) for the current pixel, the compensation coefficient is incorporated to perform fixed pattern noise compensation. In equation 4, "CP_ori(x,y)" indicates a pixel value of the current pixel that is multiplied by the fixed pattern noise compensation coefficient (gain_intp(k)) of the current pixel, such that the fixed pattern noise compensation is completed. Further, the equation 4 incorporates a parameter "adjust_rate" to adjust strength of the fixed pattern noise compensation coefficient when encountering various intensities of different light sources. The pixel value of the current pixel is multiplied by the compensation coefficient (gain_intp(k)) and an adjustment parameter (adjust_rate) so as to obtain the pixel value (CP(x,y)) that is adjusted and compensated by the fixed pattern noise compensation coefficient.

CP(x,y)=CP_ori(x,y)×gain_intp×adjust_rate.  Equation 4

When the above step for performing fixed pattern noise compensation for each of the pixels is completed, it is possible that a stripe pattern may still occur in some regions. It is observed that the stripe pattern is determined if an obvious difference between two directions, i.e., up and down or left and right, of the green pixel in the image is found. Therefore, in the method for compensating an image having fixed pattern noise, an aspect of a self-adaptive compensation is applied to the green pixel (step S413).

Figure 9:
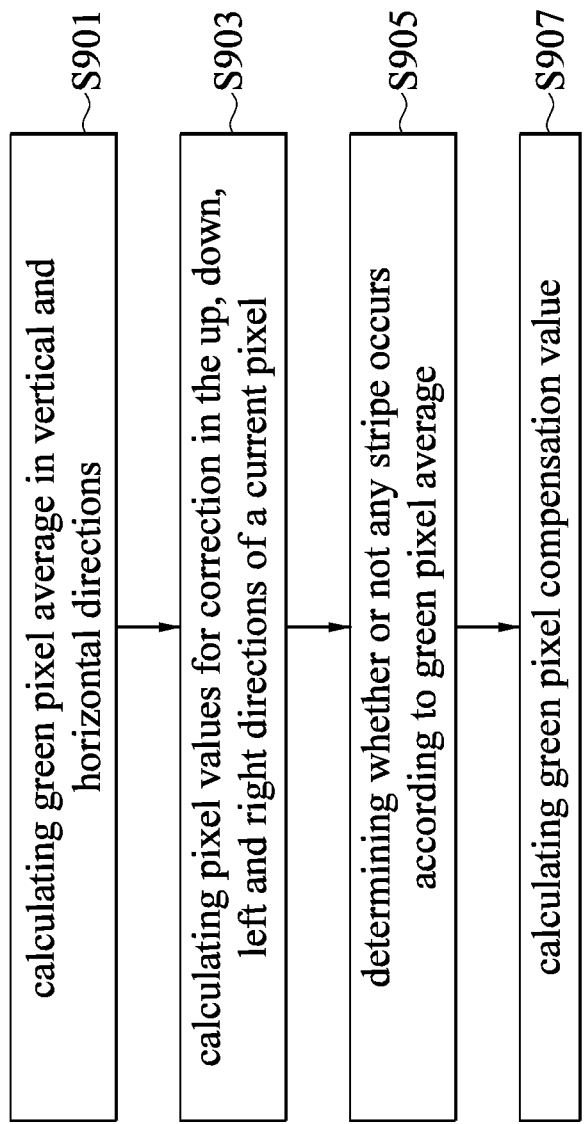
FIG. 9 shows a flow chart describing the process for self-adaptive compensation with respect to the green pixel according to one embodiment of the disclosure.

For solving the issue of the stripe pattern that is produced due to the difference between green pixel values in two directions (i.e., up and down directions or left and right directions), according to the embodiment of the method for compensating an image having fixed pattern noise, it is firstly determined whether or not any stripe pattern is in the image. References are made to FIG. 7A and FIG. 7B, which are schematic diagrams depicting the pixels in the vertical and horizontal directions of the current pixel. The method can also be referred to in FIG. 9, which shows a flow chart describing the process for self-adaptive compensation adapted to the green pixel in one embodiment of the disclosure.

Figures 7A, 7B:
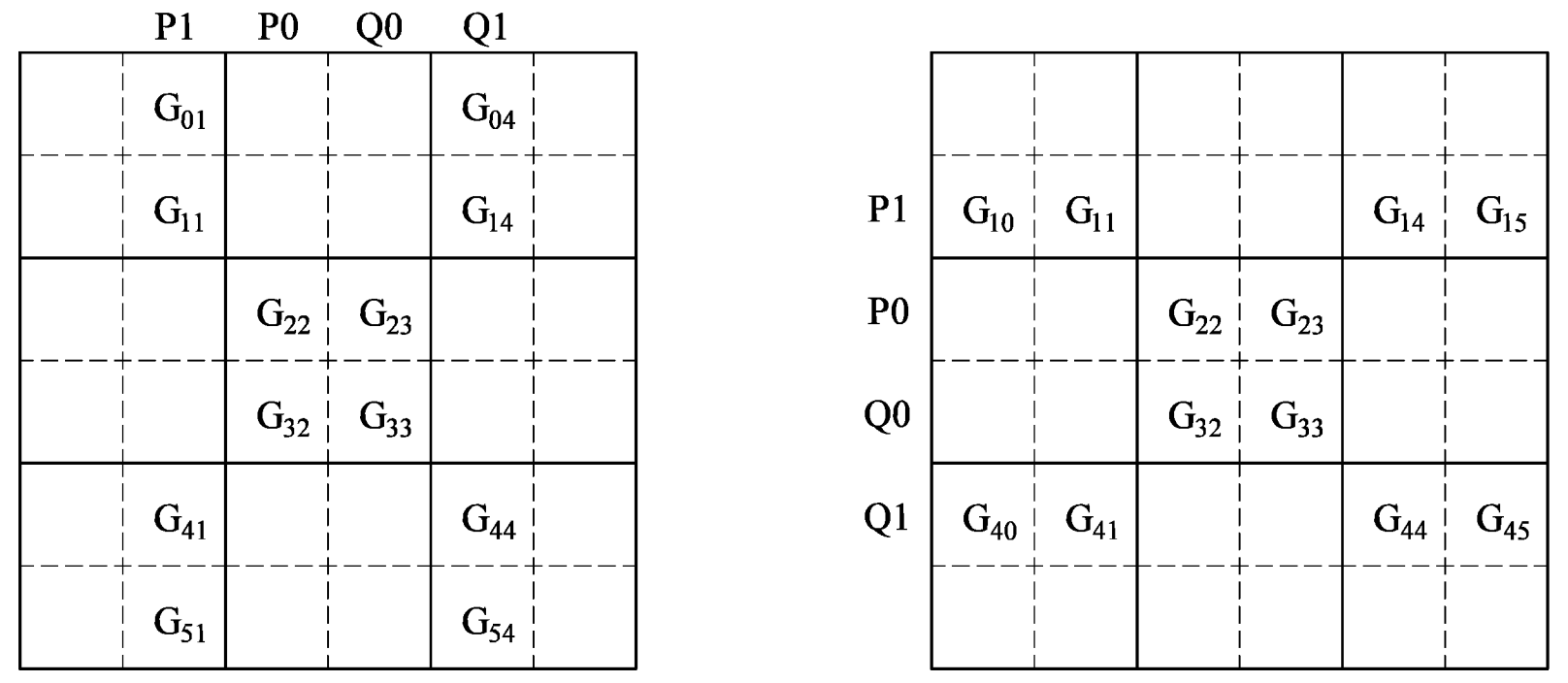

For detecting the stripe pattern in the image, referring to FIG. 7A, a green pixel average of the pixel values of the green pixels $P1_{col}$, $P0_{col}$, $Q0_{col}$ and $Q1_{col}$ adjacent to the current green pixel in the vertical direction is calculated. The green pixels adjacent to the current green pixel are such as the other green pixels closest to the current green pixel. Further, referring to FIG. 7B, another green pixel average of the pixel values of the green pixels $P1_{row}$, $P0_{row}$, $Q0_{row}$ and $Q1_{row}$ adjacent to the current green pixel in the horizontal direction is calculated (step S901). FIG. 7A also shows the schematic diagram of specific positions of a 4-cell in a 4-cell group, in which the green pixels of the 4-cell in the grid are shown. For example, "$G_{01}$" represents the green pixel in row 0 and column 1, "$G_{23}$" represents the green pixel in row 2 and column 3, and so on.

In FIG. 7A, when the current pixel is the green pixel $G_{22}$, $G_{23}$, $G_{32}$ or $G_{33}$, the pixel averages $P1_{col}$, $P0_{col}$, $Q0_{col}$ and $Q1_{col}$ of the green pixels in the vertical direction of the current pixel are adopted in the method. The green pixel averages are as indicated in equation 5.

$$P1_{col} = \frac{G_{01} + G_{11} + G_{41} + G_{51}}{4};$$
$$P0_{col} = \frac{G_{22} + G_{32}}{2};$$
$$Q0_{col} = \frac{G_{23} + G_{33}}{2}; \text{ and}$$
$$Q1_{col} = \frac{(G_{04} + G_{14} + G_{44} + G_{54})}{4}.$$

Equation 5

In FIG. 7B, when the current pixel is still the green pixel $G_{22}$, $G_{23}$, $G_{32}$ or $G_{33}$, the pixel averages $P1_{row}$, $P0_{row}$, $Q0_{row}$ and $Q1_{row}$ of the green pixels in the horizontal direction of the current pixel are also adopted in the method. The green pixel averages are as indicated in equation 6.

$$P1_{row} = \frac{G_{10} + G_{11} + G_{14} + G_{15}}{4}$$
$$P0_{row} = \frac{G_{22} + G_{23}}{2}$$
$$Q0_{row} = \frac{G_{32} + G_{33}}{2}$$
$$Q1_{row} = \frac{(G_{40} + G_{41} + G_{44} + G_{45})}{4}$$

Equation 6

Figures 8A, 8B:
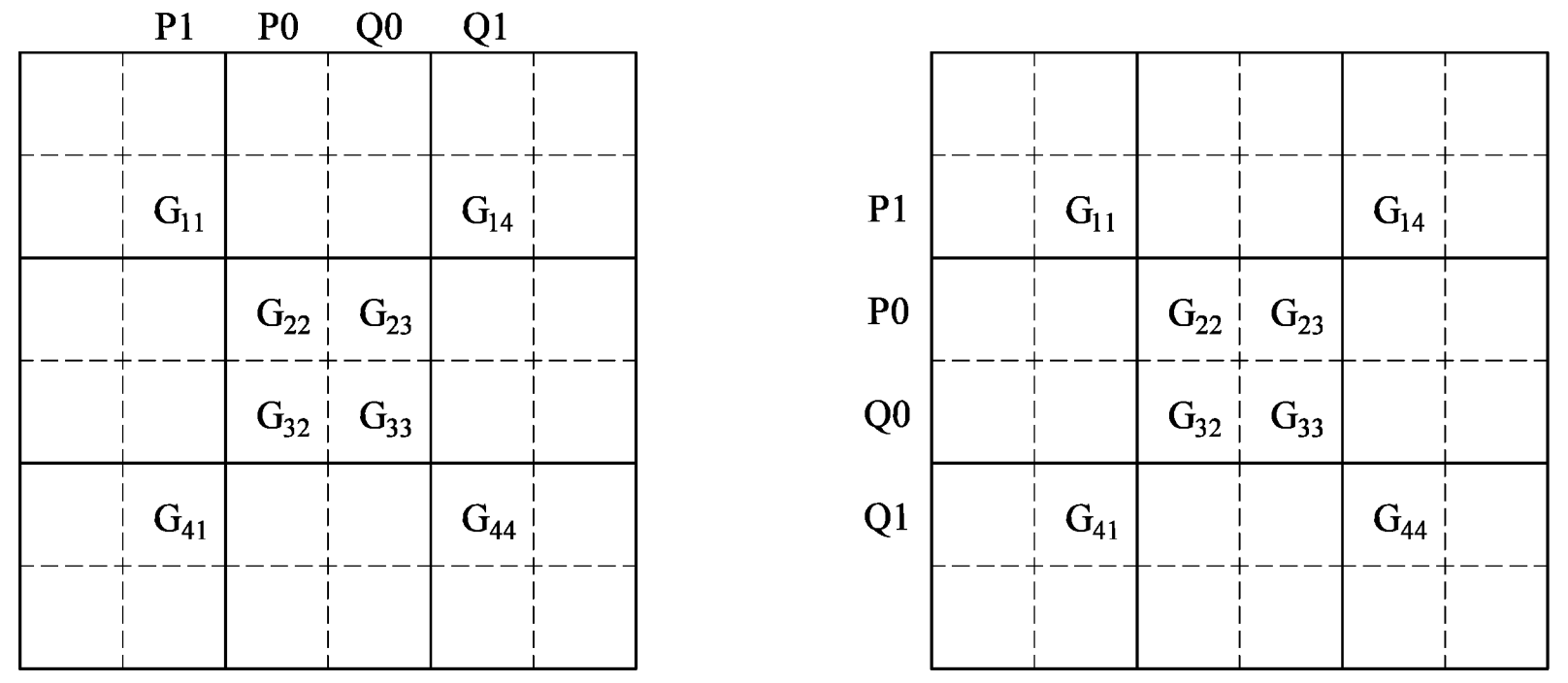

After obtaining the vertical and horizontal green pixel averages with respect to the current green pixel shown in the exemplary examples, the pixel values used for correction in the "up" direction (U), "down" direction (D), "left" direction (L) and "right" direction (R) of the current pixel are calculated (step S903). Further exemplary examples are shown in FIG. 8A and FIG. 8B that are schematic diagrams depicting the pixels used for correcting the stripe pattern.

With the green pixels adjacent to the green pixel in the up, down, left and right directions as an example, if the current green pixel ($G_{cur}$) is "$G_{22}$", the pixel value used for correction in the left column (L) having the green pixels $G_{11}$ and $G_{41}$ is calculated as:

$$L = \frac{G_{11} + G_{41}}{2}$$

The pixel value used for correction in the right column (R) of the green pixel $G_{22}$ is $G_{23}$:

$$R = G_{23}$$

The pixel value used for correction in the upper row (U) having the green pixels $G_{11}$ and $G_{14}$ of the green pixel $G_{22}$ is calculated as:

$$U = \frac{G_{11} + G_{14}}{2}$$

The pixel value used for correction in the lower row (D) of the green pixel $G_{22}$ is $G_{32}$:

$$D = G_{32}$$

If the current green pixel ($G_{cur}$) is $G_{23}$, the green pixel used for correction in the left column (L) is $G_{22}$:

$$L = G_{22}$$

The pixel value used for correction in the right column (R) having the green pixels $G_{14}$ and $G_{44}$ with respect to $G_{23}$ is calculated as:

$$R = \frac{G_{14} + G_{44}}{2}$$

The pixel value used for correction in the upper row (U) having the green pixels $G_{11}$ and $G_{14}$ with respect to $G_{23}$ is calculated as:

$$U = \frac{G_{11} + G_{14}}{2}$$

The pixel values used for correction in the lower row (D) of the green pixel $G_{23}$ is $G_{32}$:

$$D = _{32},$$

If the current green pixel ($G_{cur}$) is $G_{32}$, the pixel value of the left column (L) having the green pixels $G_{11}$ and $G_{41}$ with respect to the current green pixel is calculated as:

$$L = \frac{G_{11} + G_{41}}{2}$$

The pixel value used for correction in the right column (R) of the green pixel $G_{32}$ is $G_{33}$:

$$R = G_{33}$$

The pixel value used for correction in the upper row (U) of the green pixel $G_{32}$ is $G_{22}$:

$$U = G_{22}$$

The pixel value used for correction in the lower row (D) having the green pixels $G_{41}$ and $G_{44}$ with respect to the green pixel $G_{32}$ is calculated as:

$$U = \frac{G_{41} + G_{44}}{2}$$

Further, when the current green pixel ($G_{cur}$r) is $G_{33}$, the green pixel used for correction in the left column (L) is $G_{32}$:

$$L = G_{az}$$

The pixel value used for correction in the right column (R) having the green pixels $G_{14}$ and $G_{44}$ with respect to the green pixel $G_{33}$ is calculated as:

$$R = \frac{G_{14} + G_{44}}{2}$$

The pixel value used for correction in the upper row (U) of the green pixel $G_{33}$ is $G_{23}$:

$$U = G_{23}$$

The pixel value used for correction in the lower row having the green pixels $G_{41}$ and $G_{44}$ with respect to the green pixel $G_{33}$ is calculated as:

$$D = \frac{G_{41} + G_{44}}{2}$$

According to the above exemplary examples, e.g., the equations 5 and 6, the pixel averages ($P1_{col}$, $P0_{col}$, $Q0_{col}$ and $Q1_{col}$) of the adjacent green pixels in the vertical direction and the pixel averages ($P1_{row}$, $P0_{row}$, $Q0_{row}$ and $Q1_{row}$) of the adjacent green pixels in the horizontal direction of the current green pixel (e.g., $G_{22}$, $G_{23}$, $G_{32}$ or $G_{33}$) are calculated. As shown in FIG. 7A and FIG. 7B, the difference between the pixel averages of the four green pixels in the vertical direction and in the horizontal direction can be used to detect if there is an edge and check the flatness so as to determine if the stripe pattern is in the image (step S905).

Three steps to determine the stripe pattern are described as follows. In a first step, a difference between the vertical pixel averages is compared with a first column threshold ($TH_{COL1}$), and a difference between the horizontal pixel averages is compared with a first row threshold ($TH_{ROW1}$). The comparison results ($FLAG_{COL1}$, $FLAG_{ROW1}$) can be used to determine whether or not the current green pixel is at the edge. Equation 7 is used to determine the edges in the vertical and horizontal directions. An operator "Bool" indicates a Boolean operation.

$$BooL\ FLAG_{COL1} = |P1_{col} + P0_{col} - Q0_{col} - Q1_{col}| < TH_{COL1}$$

$$Bool\ FLAG_{ROW1} = |P1_{row} + P0_{row} - Q0_{row} - Q1_{row}| < TH_{ROW1} \qquad \text{Equation 7}$$

Next, in a second step, the flatness in the vertical and horizontal directions near the current green pixel is determined. Referring to equation 8, FIG. 7A and FIG. 7B, a difference between the pixel averages of the pixels adjacent to the current green pixel in the vertical direction is compared with a second column threshold ($TH_{COL2}$), and a difference between the pixel averages of the pixels adjacent to the current green pixel in the horizontal direction is compared with a second row threshold ($TH_{ROW2}$). The comparison results ($FLAG_{COL2}$, $FLAG_{ROW2}$) can be used to determine the flatness near the current pixel. It is determined to be flat in the image, i.e., flatness, if the difference between the vertical green pixel averages is smaller than the predetermined threshold. It is also determined to be flat in the image if the difference between the horizontal green pixel averages is smaller than the predetermined threshold.

$$Bool\ FLAG_{COL2} = |P1_{col} - P0_{col}| < TH_{COLZ}$$

$$Bool\ FLAG_{ROW2} = |P1_{row} - P0_{row}| < TH_{ROW2} \qquad \text{Equation 8}$$

Equation 9 indicates the differences of the pixel averages of the pixels adjacent to the current green pixel in the vertical and horizontal directions. After the pixel averages of the pixels adjacent to the current green pixel in the vertical and horizontal directions are compared with a third column threshold ($TH_{COL3}$) and a third row threshold ($TH_{ROW3}$) respectively, comparison results ($FLAG_{COL3}$, $FLAG_{ROW3}$) are used to determine the flatness near the current pixel.

$$Bool\ FLAG_{COL3} = |Q0_{col} - Q1_{col}| < TH_{COL3}$$

$$Bool\ FLAG_{ROW3} = |Q0_{row} - Q1_{row}| < TH_{ROW3} \qquad \text{Equation 9}$$

The information of flatness ($FLAG_{COL1}$, $FLAG_{ROW1}$, $FLAG_{COL2}$, $FLAG_{ROW2}$, $FLAG_{COL3}$, $FLAG_{ROW3}$) can be used to determine whether or not any stripe pattern exists in the vertical and/or horizontal directions of the current pixel (step S905), as shown in equation 10.

$$Bool\ FLAG_{COL} = FLAG_{COL1}\ \&\&\ FLAG_{COL2}\ \&\&\ FLAG_{COL3}$$

$$Bool\ FLAG_{ROW} = FLAG_{ROW1}\ \&\&\ FLAG_{ROW2}\ \&\&\ FLAG_{ROW3} \qquad \text{Equation 10}$$

According to equation 10 in the present disclosure, a compensation value for a green pixel is calculated based on several conditions of the stripe patterns in the vertical or/and horizontal direction. Afterwards, the pixel value of the current pixel is compensated through the pixel value that is configured to be used for correction, in the up, down, left and right directions of the current pixel (step S907).

Scenario one: in equation 10, when $FLAG_{COL}$ and $FLAG_{ROW}$ are true and the current pixel is neither a horizontal edge nor a vertical edge, both the horizontal edge and the vertical edge are indicated as having stripe patterns. At this time, in equation 11, the above green pixel values of the up, down, left and right green pixels adjacent to the current green pixel ($G_{cur}$) are introduced, and the fixed pattern noise compensation coefficient (COEF) is used to correct the current green pixel ($G_{cur}$). The corrected green pixel can be represented as "$\hat{G}_{cur}$."

$$\hat{G}_{cur} = G_{cur} + (L - G_{cur}) \times COEF + (R - G_{cur}) \times COEF + (U - G_{cur}) \times COEF + (D - G_{cur}) \times COEF$$

"L" indicates the pixel value of the left green pixel for correction. "R" indicates the pixel value of the right green pixel for correction. "U" indicates the pixel value of the upper green pixel for correction, and "D" indicates the pixel value of the bottom green pixel for correction.

Scenario two: the above determination is false, and when $FLAG_{COL}$ is true and the current pixel is not at the horizontal edge, the vertical edge is indicated as having stripe patterns. In the meantime, equation 12 is introduced to using the pixel values of the pixels in the left column (L) and right column (R) with respect to the current pixel to obtain the fixed pattern noise compensation coefficient (COEF) calculated by the flow chart shown in FIG. 4 so as to correct the current green pixel. The corrected green pixel can be represented as "$\hat{G}_{cur}$."

$$\hat{G}_{cur}=G_{cur}+(L-G_{cur})\times\text{COEF}+(R-G_{cur})\times\text{COEF} \qquad \text{Equation 12}$$

Scenario three: the above two determinations are false, but $\text{FLAG}_{ROW}$ is true and the current pixel is not at the vertical edge, indicating that the horizontal edge has stripe patterns. In the meantime, equation 13 is introduced to using the pixel values of the pixels in the upper row (U) and lower row (D) with respect to the current pixel to obtain the fixed pattern noise compensation coefficient (COEF) so as to correct the current green pixel. The corrected green pixel can be represented as "$\hat{G}_{cur}$."

$$\hat{G}_{cur}=G_{cur}+(U-G_{cur})\times\text{COEF}+(D-G_{cur})-\text{COEF}$$

Scenario four: the above three determinations are false, indicating that no stripe pattern is detected.

In summation, according to the above embodiments of the method for compensating an image having fixed pattern noise and the system implementing the method, the method is applied to the system exemplarily shown in FIG. 10, in which an image is formed from a light received by the lens 101 and processed by the image sensor 103. The processing circuit 107 of the system performs the method with respect to the fixed pattern noise in the image. The grid-based compensation method is able to obtain the compensation coefficients for the divided grids. Accordingly, the image is compensated regionally, and a self-adaptive compensation can be performed on the green pixel. The method can be performed in a 4-cell sensor that adopts a 4-cell group and implements the image sensor with respect to each of the channels. In the method, the appropriate compensation parameters for the fixed pattern noise can be calculated automatically based on non-uniformity of the image sensor and the lens.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for compensating an image having fixed pattern noise, performed by a system including a 4-cell sensor and a processing circuit, comprising:
    dividing the image into multiple grids in an array, wherein each of the grids includes multiple 4-cell groups, each of the 4-cell groups includes 4 cells that record pixel values generated by the 4-cell sensor, and each cell includes 4 pixels;
    calculating a channel average that is a pixel average for every channel of each of the grids;
    calculating a pixel average of pixels in a 4-cell group;
    calculating a fixed pattern noise compensation coefficient for every pixel of the image according to a ratio of the pixel average of every channel in each of the grids and the pixel average of pixels of every channel; and
    performing fixed pattern noise compensation for the image, wherein the fixed pattern noise compensation coefficient (gain_intp) of a current pixel is multiplied by a pixel value (CP_ori(x,y)) of the current pixel, and a parameter "adjust_rate" is introduced to adjust strength of the fixed pattern noise compensation coefficient with respect to different intensities of different light sources so as to complete fixed pattern noise compensation;
    wherein the pixel value (CP(x,y)) with the fixed pattern noise compensation is obtained by a formula of CP(x,y)=CP_ori (x,y)=gain_intp=adjust rate.

2. The method according to claim 1, wherein the 4 cells of the 4-cell group respectively record red channel value (R), blue channel value (B) and green channels (Gr, Gb) values generated by the 4-cell sensor through a quad Bayer array filter.

3. The method according to claim 2, wherein the 4 cells of the 4-cell group include 16 pixels, in which a position of every pixel is denoted by a position index and the pixel average for every channel of each of the grids is an average of a summation of the pixel averages of the pixels with the same position indexes in each of the grids, so as to form the channel average.

4. The method according to claim 3, wherein the channel average of each of the grids is denoted by BGridAvg (i,j), RGridAvg (i,j), GbGridAvg (i,j) and GrGridAvg (i,j), and the pixel average of the pixels in the 4-cell group is denoted by localAvg (i,j,k), wherein (i,j) marks a position of each of the grids, k indicates a position of every pixel in the 4-cell group, and k is a position index of 0 to 15, wherein equations to calculate a fixed pattern noise compensation coefficient (gain (i,j,k)) of pixels are:

gain (i,j,0)=GrGridAvg (i,j)÷localAvg (i,j,0);

gain (i,j,1)=GrGridAvg (i,j)÷localAvg (i,j,1);

gain (i,j,2)=RGridAvg (i,j)÷localAvg (i,j,2);

gain (i,j,3)=RGridAvg (i,j)÷localAvg (i,j,3);

gain (i,j,4)=GrGridAvg (i,j)÷localAvg (i,j,4);

gain (i,j,5)=GrGridAvg (i,j)÷localAvg (i,j,5);

gain (i,j,6)=RGridAvg (i,j)÷localAvg (i,j,6);

gain (i,j,7)=RGridAvg (i,j)÷localAvg (i,j,7);

gain (i,j,8)=BGridAvg (i,j)÷localAvg (i,j,8);

gain (i,j,9)=BGridAvg (i,j)÷localAvg (i,j,9);

gain (i,j,10)=GbGridAvg (i,j)÷localAvg (i,j, 10);

gain (i,j,11)=GbGridAvg (i,j)÷localAvg (i,j,11);

gain (i,j,12)=BGridAvg (i,j)÷localAvg (i,j,12);

gain (i,j,13)=BGridAvg (i,j)÷localAvg (i,j,13);

gain (i,j,14)=GbGridAvg (i,j)÷localAvg (i,j,14); and gain (i,j,15)=GbGridAvg (i,j)÷localAvg (i,j,15).

5. The method according to claim 1, wherein, when the fixed pattern noise compensation is completed, further detecting any stripe pattern produced by a difference between a pixel value of a current green pixel and green pixel values in the up and down directions or left and right directions of the current green pixel, and a self-adaptive compensation is performed to:
- calculate a green pixel average of adjacent green pixels in a vertical direction of the current green pixel and another green pixel average of adjacent green pixels in the horizontal direction of the current green pixel;
- calculate a pixel value used for correction in the up, down, left and right directions of the current green pixel;
- detect an edge and flatness near the current green pixel according to a difference of pixel averages between four horizontal directions and four vertical directions adjacent to the current green pixel so as to determine if any stripe pattern is in the vertical and horizontal directions in the image; and
- according to the determined stripe pattern, use the pixel values in the up, down, left and right directions of the current pixel to compensate the pixel value of the current green pixel.

6. The method according to claim 1, wherein extrapolation is used to optimize the fixed pattern noise compensation coefficient of the pixel at an edge of the image, in which one row and one column are added at the edge of the image that includes multiple grids in the array, and the extrapolation is used to obtain the fixed pattern noise compensation coefficient of the pixel at the edge.

7. The method according to claim 6, wherein equations for calculating the fixed pattern noise compensation coefficient of the pixel at the edge by the extrapolation are:

upper edge: gain(0,j,k)=2×gain(1,j,k)−gain(2,j,k), wherein 1≤j≤n;

lower edge: gain(m+1,j,k)=2×gain(m,j,k)−gain(m−1,j,k), wherein 1≤j≤n;

left edge: gain(i,0,k)=2×gain(i,1,k)−gain(i,2,k), wherein 1≤i≤m;

right edge: gain(i,n+1,k)=2×gain(i,n,k)−gain(i,n−1,k), wherein 1≤i≤m;

upper left: gain(0,0,k)=2×gain(1,1,k)−gain(2,2,k);

upper right: gain(0,n+1,k)=2×gain(1,n,k)−gain(2,n−1,k);

bottom left: gain(m+1,0,k)=2×gain(m,1,k)−gain(m−1,2,k); and bottom right: gain(m+1,n+1,k)=2×gain(m,n,k)−gain(m−1,n−1,k);

wherein "m" is a height of an original grid of the image, "n" is a width of the original grid of the image, "gain(i,j,k)" is the fixed pattern noise compensation coefficient of the pixel of the image, "(i,j)" is used to describe a position of the grid after the row and column are added, and "k" is a position index of the pixel.

8. The method according to claim 1, wherein interpolation is further used to obtain the fixed pattern noise compensation coefficient of the current pixel, in which multiple grids adjacent to the current pixel are determined, and distances between the current pixel and center points of the multiple grids are calculated, and the interpolation is performed according to the distances so as to obtain the fixed pattern noise compensation coefficient of the current pixel.

9. The method according to claim 8, wherein a vertical distance between the current pixel and upper-left and upper-right grids is D1, a vertical distance between the current pixel and bottom-left and bottom-right grids is D2, a horizontal distance between the current pixel and upper-left and bottom-left grids is D3, and a horizontal distance between the current pixel and upper-right and bottom-right is D4, wherein equations of the interpolation are:

gain_intp(k)=(D2/(D1+D2))×(D4/(D3+D4))×gain(i1,j1,k)+(D2/(D1+D2))×(D3/(D3+D4))×gain(i2,j2,k)+(D1/(D1+D2))×(D4/(D3+D4))×gain(i3,j3,k)+(D1/(D1+D2))×(D3/(D3+D4))×gain(i4,j4,k);

wherein "gain_intp(k)" is the fixed pattern noise compensation coefficient for the current pixel obtained by the interpolation, and "gain(i1 j1,k), gain(i2,j2,k), gain(i3,j3,k) and gain(i4,j4,k)" are the fixed pattern noise compensation coefficients for the central pixels of the grids adjacent to the current pixel.

10. A system, comprising:
a 4-cell sensor; and
a processing circuit, which performs a method for compensating an image having fixed pattern noise when receiving an image, the method comprising:
- dividing an image into multiple grids in an array, wherein each of the grids includes multiple 4-cell groups, each of the 4-cell groups includes 4 cells that record pixel values generated by a 4-cell sensor, and each cell includes 4 pixels;
- calculating a channel average that is a pixel average for every channel of each of the grids;
- calculating a pixel average of pixels in a 4-cell group;
- calculating a fixed pattern noise compensation coefficient for every pixel of the image according to a ratio of the pixel average of every channel in each of the grids and the pixel average of pixels of every channel; and
- performing fixed pattern noise compensation for the image, wherein the fixed pattern noise compensation coefficient (gain_intp) of a current pixel is multiplied by a pixel value (CP_ori(x,y)) of the current pixel, and a parameter "adjust_rate" is introduced to a adjust strength of the fixed pattern noise compensation coefficient with respect to different intensities of different light sources so as to complete fixed pattern noise compensation;
wherein the pixel value (CP(x,y)) with the fixed pattern noise compensation is obtained by a formula of CP(x,y))=CP_ori (x,y)×gain_intp×adjust rate.

11. The system according to claim 10, wherein the 4-cell sensor, and the 4 cells of the 4-cell group in the image respectively record red channel value (R), blue channel value (B) and green channel values (Gr, Gb) generated by the 4-cell sensor through a quad Bayer array filter.

12. The system according to claim 11, wherein the 4 cells of the 4-cell group include 16 pixels, in which a position of every pixel is denoted by a position index and the pixel average for every channel of each of the grids is an average of a summation of the pixel averages of the pixels with the same position indexes in each of the grids, so as to form the channel average.

13. The system according to claim 12, wherein, in the method for compensating an image having fixed pattern noise, the channel average of each of the grids is denoted by: BGridAvg (i,j), RGridAvg (i,j), GbGridAvg (i,j) and GrGridAvg (i,j) and the pixel average of the pixels in the 4-cell group is denoted by localAvg (i,j,k), wherein (i,j) marks position of each of the grids, k indicates position of every pixel in the 4-cell group, and k is position index of 0 to 15; wherein equations to calculate fixed pattern noise compensation coefficient (gain (i,j,k)) of pixels are:

Gain (i,j,0)=GrGridAvg (i,j)÷localAvg (i,j,0);

gain (i,j,1)=GrGridAvg (i,j)÷localAvg (i,j,1);

gain (i,j,2)=RGridAvg (i,j)÷localAvg (i,j,2);

Gain (i,j,3)=RGridAvg (i,j)÷localAvg (i,j,3);

gain (i,j,4)=GrGridAvg (i,j)÷localAvg (i,j,4);

gain (i,j,5)=GrGridAvg (i,j)÷localAvg (i,j,5);

gain (i,j,6)=RGridAvg (i,j)÷localAvg (i,j,6);

gain (i,j,7)=RGridAvg (i,j)÷localAvg (i,j,7);

gain (i,j,8)=BGridAvg (i,j)÷localAvg (i,j,8);

gain (i,j,9)=BGridAvg (i,j)÷localAvg (i,j,9);

gain (i,j,10)=GbGridAvg (i,j)÷localAvg (i,j,10);

gain (i,j,11)=GbGridAvg (i,j)÷localAvg (i j,11);

gain (i,j,12)=BGridAvg (i,j)÷localAvg (i,j,12);

gain (i,j,13)=BGridAvg (i,j)÷localAvg (i,j,13);

gain (i,j,14)=GbGridAvg (i,j)÷localAvg (i,j,14); and gain (i,j,15)=GbGridAvg (i,j)÷localAvg (i,j,15).

14. The system according to claim 10, wherein, in the method for compensating an image having fixed pattern noise, when the fixed pattern noise compensation is completed, further detecting any stripe pattern produced by a difference between a pixel value of a current green pixel and green pixel values in the up and down directions or left and right directions of the current green pixel, and a self-adaptive compensation is performed to:
  calculate a green pixel average of adjacent green pixels in a vertical direction of the current green pixel and another green pixel average of adjacent green pixels in the horizontal direction of the current green pixel;
  calculate a pixel value used for correction in the up, down, left and right directions of the current green pixel;
  detect an edge and flatness near the current green pixel according to a difference of pixel averages between four horizontal directions and four vertical directions adjacent to the current green pixel so as to determine if any stripe pattern is in the vertical and horizontal directions in the image; and
  according to the determined stripe pattern, use the pixel values in the up, down, left and right directions of the current pixel to compensate the pixel value of the current green pixel.

15. The system according to claim 10, wherein, in the method for compensating an image having fixed pattern noise, extrapolation is used to optimize the fixed pattern noise compensation coefficient of the pixel at an edge of the image; in which one row and one column are added at the edge of the image that includes multiple grids in the array; and the extrapolation is used to obtain the fixed pattern noise compensation coefficient of the pixel at the edge.

16. The system according to claim 15, wherein equations for calculating the fixed pattern noise compensation coefficient of the pixel at the edge by the extrapolation are:

upper edge: gain(0,j,k)=2×gain(1,j,k)−gain(2,j,k), wherein 1≤j≤n;

lower edge: gain(m+1,j,k)=2×gain(m,j,k)−gain(m−1,j,k), wherein 1≤j≤n;

left edge: gain(i,0,k)=2×gain(i,1,k)−gain(i,2,k), wherein 1≤i≤m;

right edge: gain(i,n+1,k)=2×gain(i,n,k)−gain(i,n−1,k), wherein 1≤i≤m;

upper left: gain(0,0,k)=2×gain(1,1,k)−gain(2,2,k);

upper right: gain(0,n+1,k)=2×gain(1,n,k)−gain(2,n−1,k);

bottom left: gain(m+1,0,k)=2×gain(m,1,k)−gain(m−1,2,k); and bottom right: gain(m+1,n+1,k)=2×gain(m,n,k)−gain(m−1,n−1,k);

wherein, "m" is a height of an original grid of the image, "n" is a width of the original grid of the image, "gain (i,j,k)" is the fixed pattern noise compensation coefficient of the pixel of the image, "(i,j)" is used to describe a position of the grid after the row and column are added, and "k" is a position index of the pixel.

17. The system according to claim 10, wherein, in the method for compensating an image having fixed pattern noise, interpolation is further used to obtain the fixed pattern noise compensation coefficient of the current pixel, in which multiple grids adjacent to the current pixel are determined, and distances between the current pixel and center points of the multiple grids are calculated, and the interpolation is performed according to the distances so as to obtain the fixed pattern noise compensation coefficient of the current pixel.

18. The system according to claim 17, wherein a vertical distance between the current pixel and upper-left and upper-right grids is D1, a vertical distance between the current pixel and bottom-left and bottom-right grids is D2, a horizontal distance between the current pixel and upper-left and bottom-left grids is D3, and a horizontal distance between the current pixel and upper-right and bottom-right is D4, wherein equations of the interpolation are:

gain_intp(k)=(D2/(D1+D2))−(D4/(D3+D4))×gain(i1,j1,k)+(D2/(D1+D2))×(D3/(D3+D4))×gain(i2,j2,k)+(D1/(D1+D2))×(D4/(D3+D4))×gain(i3,j3,k)+(D1/(D1+D2))×(D3/(D3+D4))×gain(i4,j4,k);

wherein, "gain_intp(k)" is the fixed pattern noise compensation coefficient for the current pixel obtained by the interpolation, and "gain(i1,j1,k), gain(i2,j2,k), gain (i3,j3,k) and gain(i4,j4,k)" are the fixed pattern noise compensation coefficients for the central pixels of the grids adjacent to the current pixel.

* * * * *